United States Patent [19]

Tenney et al.

[11] 4,178,424
[45] Dec. 11, 1979

[54] CYCLOOLEFIN COPOLYMERS

[75] Inventors: Linwood P. Tenney, Hudson; Parley C. Lane, Jr., Cuyahoga Falls, both of Ohio

[73] Assignee: The BF Goodrich Company, Akron, Ohio

[21] Appl. No.: 974,650

[22] Filed: Dec. 29, 1978

Related U.S. Application Data

[63] Continuation-in-part of Ser. No. 857,141, Dec. 5, 1977, Pat. No. 4,136,247.

[51] Int. Cl.$^2$ .................... C08F 32/08; C08F 232/08
[52] U.S. Cl. .................................... 526/283; 526/84; 526/142; 526/169; 526/916
[58] Field of Search ............................... 526/283, 916

[56] References Cited

U.S. PATENT DOCUMENTS 4,110,528  8/1978  Minchak ........................ 526/283

*Primary Examiner*—Herbert J. Lilling
*Attorney, Agent, or Firm*—J. Hughes Powell, Jr.

[57] ABSTRACT

Thermoplastic copolymers comprise (1) tetracyclododecene, at least one alkyltetracyclododecene, or a mixture thereof copolymerized by ring opening with (2) norbornene, at least one alkylnorbornene or a mixture thereof, (3) dicyclopentadiene, and (4) at least one acyclic monoolefin or nonconjugated acyclic olefin. The copolymers can be calendered and thermoformed, for example, to make rigid automotive goods such as glovebox covers, hubcaps, and the like.

5 Claims, No Drawings

CYCLOOLEFIN COPOLYMERS

CROSS-REFERENCE TO RELATED APPLICATIONS

This is a continuation-in-part of U.S. Patent Application Ser. No. 857,141 filed Dec. 5, 1977 now U.S. Pat. No. 4,136,247. The present application is also related to U.S. Patent Application Ser. Nos. 857,142 now U.S. Pat. No. 4,136,248 and 857,161, now U.S. Pat. No. 4,136,249 both filed Dec. 5, 1977.

BACKGROUND OF THE INVENTION

Cycloolefins can be polymerized through the olefin structure to yield polycycloaliphatics, or through a ring-opening process to yield unsaturated linear polymers. The latter process has particular appeal since the resulting polymers are sulfur-vulcanizable. Cyclopentene is a readily available ethylene production by-product, and considerable art has focused on the ring-opening polymerization and copolymerization of cyclopentene. Dicyclopentadiene is another readily available ethylene production by-product, but not as much consideration has been given in the prior art to dicyclopentadiene polymers. Recent U.S. Patents directed to cyclopentene and dicyclopentadiene polymers include U.S. Pat. Nos. 3,778,420, 3,781,257, 3,790,545, 3,853,830, and 4,002,815.

Norbornene (bicyclo[2.2.1]-hept-2-ene) and substituted norbornenes can be produced by Diels-Alder reaction of cyclopentadiene with selected olefins. U.S. Pat. No. 3,074,918 is directed to polymerization of cyclic olefins having at least one unsubstituted ring double bond and not more than one double bond in each ring, such as dicyclopentadiene, 1,2-dihydrodicyclopentadiene, norbornene, or substituted norbornenes. U.S. Pat. No. 3,546,183 describes elastomer polymers or polymers which can be used as bases for elastomer compositions, having in their structural formula units of alkyl-5-bicyclo[2.2.1]hept-2-ene or alkoxy-5-bicyclo[2.2.1]hept-2-ene. Other U.S. patents directed to norbornene and substituted norbornene polymers include U.S. Pat. Nos. 2,721,189, 2,831,037, 2,932,630, 3,330,815, 3,367,924, 3,467,633, 3,836,593, 3,879,343 and 4,020,021.

Tetracyclododecene (1,4:5,8-dimethano-1,2,3,4,4a,5,8,8a-octahydronaphthalene) and alkyltetracyclododecenes can be made by Diels-Alder reaction of cyclopentadiene with norbornene or substituted norbornenes. U.S. Pat. No. 3,557,072 describes plastomers obtained by polymerizing tetracyclododecene and its alkyl derivatives with 0 to 99% of a copolymerizable compound, for example, an ethylenically-unsaturated compound such as norbornene and its alkyl derivatives, styrene, and the cyclic olefins.

Acyclic olefins are commonly used as molecular weight modifiers in cycloolefin polymerizations. See, for example, U.S. Pat. Nos. 4,002,815, 4,025,708, 4,069,376 and 4,110,528.

Polymers of dicyclopentadiene, alone or with acyclic monoolefins or nonconjugated acyclic olefins, have excellent glass transition temperatures but are difficult to process. Polymers of tetracyclododecene or substituted tetracyclododecenes, alone or with acyclic monoolefins or nonconjugated acyclic olefins, generally have even higher glass transition temperatures as well as improved stability but are still more difficult to process. Finally, polymers of norbornene or most alkylnorbornenes with acyclic monoolefins or nonconjugated acyclic olefins process easily but have lower glass transition temperatures than desired for some applications. Use of dimethylnorbornene or isopropyl-norbornene provides higher glass transition temperature properties than most other alkylnorbornenes, but still less than desired for some applications.

New copolymers are desired having a balance of satisfactory processability, stability and glass transition temperatures, as well as a balance of other properties normally associated with thermoformable polymers.

SUMMARY OF THE INVENTION (1) From about 5 to about 80 wt.% of tetracyclododecene, at least one alkyltetracyclododecene wherein each alkyl group contains from 1 to about 8 carbon atoms, or a mixture thereof, is copolymerized by ring opening with (2) about 10 to about 80 wt.% of norbornene, at least one alkylnorbornene wherein each alkyl group contains from 1 to about 8 carbon atoms, or a mixture thereof, (3) about 5 to about 80 wt.% of dicyclopentadiene, and (4) a minor amount of at least one acyclic monoolefin or nonconjugated acyclic olefin. These copolymers are thermoplastics having (1) glass transition temperatures ($T_g$) significantly higher than polymers made without the tetracyclododecene, substituted tetracyclododecene or dicyclopentadiene components, (2) significantly better stability than polymers made without the tetracyclododecene or substituted tetracyclododecene component, and (3) significantly better processability than polymers made without the norbornene or alkylnorbornene component.

DETAILED DESCRIPTION

The thermoplastic copolymers of the present invention comprise ring-opened units of (1) about 5 to about 80 wt.%, more preferably from about 10 to about 40 wt.%, of tetracyclododecene, at least one alkyltetracyclododecene wherein each alkyl group contains 1 to about 8 carbon atoms, more preferably 1 to 3 carbon atoms, or a mixture thereof, (2) about 10 to about 80 wt.%, more preferably from about 10 to about 60 wt.%, of norbornene, at least one alkylnorbornene wherein each alkyl group contains 1 to about 8 carbon atoms, more preferably 1 to 3 carbon atoms, or a mixture thereof, (3) about 5 to about 80 wt.%, more preferably from about 40 to about 70 wt.%, of dicyclopentadiene, and (4) a minor amount of at least one acyclic monoolefin or nonconjugated acyclic olefin. Both tetracyclododecenes and dicyclopentadiene provide high glass transition temperature, with tetracyclododecenes generally being particularly effective in this regard, and also providing improved stability, and with dicyclopentadiene providing pendant cure sites for subsequent crosslinking reactions as well as reducing overall copolymer cost. The norbornene component (2) enhances copolymer processability significantly. The net result is a class of polymers having satisfactory processability, stability and glass transition temperatures, as well as reasonable cost and a full complement of other satisfactory properties usually associated with thermoformable polymers. This overall balance of properties makes the copolymers of the present invention, when suitably compounded, attractive substitutes for ABS, polycarbonates, etc.

Suitable tetracyclododecenes include tetracyclododecene itself, as well as 2-methyltetracyclododecene, 2-ethyltetracyclododecene, 2-isopropyltetracyclododecene, 2,3-dimethyltetracyclododecene, and the like. Tetracyclododecenes can be prepared by Diels-Alder reaction of cyclopentadiene with selected norbornenes. The tetracyclododecenes have the formula and ring numbering as shown:

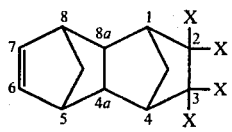

wherein any X is hydrogen or an alkyl group containing 1 to about 8 carbon atoms, more preferably 1 to 3 carbon atoms. Tetracyclododecenes may be by-products of the Diels-Alder reaction used to prepare the corresponding norbornenes and may be present at varying levels depending upon reaction conditions used (e.g., methyltetracyclododecene together with methylnorbornene). Suitable norbornenes include norbornene itself, as well as 5-methyl-2-norbornene, 5-ethyl-2-norbornene, 5-isopropyl-2-norbornene, 5,6-dimethyl-2-norbornene, 5,5-dimethyl-2-norbornene, 5-octyl-2-norbornene, 5-decyl-2-norbornene, 5-dodecyl-2-norbornene, and 5-octadecyl-2-norbornene. The norbornenes can be manufactured readily by Diels-Alder reaction of cyclopentadiene with selected olefins. For example, Diels-Alder reaction of cyclopentadiene with ethylene produces 2-norbornene, with 2-butene produces 5,6-dimethyl-2-norbornene, with 3-methyl-1-butene produces 5-isopropyl-2-norbornene, with 1-decene produces 5-octyl-2-norbornene, and with 1-dodecene produces 5-decyl-2-norbornene.

At least one acyclic monoolefin or nonconjugated acyclic olefin is used having at least one hydrogen on each double-bonded carbon atom and containing 2 to 12 carbon atoms, more preferably 2 to 8 carbon atoms. It is known that the acyclic olefins act as molecular weight modifiers which are required for the production of an easily workable and generally hydrocarbon-soluble polymer. By easily workable is meant millable and otherwise readily thermoplastic upon appropriate heating. Examples of suitable acyclic monoolefins include normal and branched 1-olefins such as 1-butene and 3-methyl-1-butene; 2-olefins such as 2-pentene and 4-methyl-2-pentene; and 3-olefins such as 5-ethyl-3-octene. Nonconjugated acyclic normal and branched olefins include diolefins such as 1,6-hexadiene; triolefins such as 1,4,7-octatriene; and the like. The preferred acyclic monoolefins are the 1-olefins of the type described above. Excellent results were obtained using 1-butene and normal 1-hexene.

The acyclic monoolefin or nonconjugated acyclic olefin or a mixture of such olefins typically is used in a molar ratio of olefin to other monomers from about 0.0001/1 to about 0.5/1, preferably from about 0.01 to about 0.3/1.

Although the exact nature of the copolymeric structure is not fully understood, it is believed to be a linear, unsaturated polymer containing groups primarily of the following types, typically in essentially random order, where m, n and p are numbers which are proportional to the concentrations of tetracyclododecene/alkyltetracyclododecene, norbornene/alkylnorbornene, and dicyclopentadiene respectively, and any X may be hydrogen or an alkyl group containing from 1 to about 8 carbon atoms;

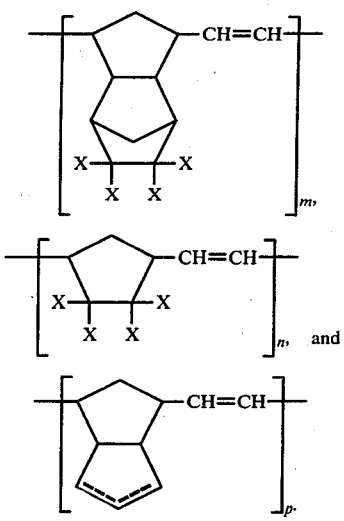

A single dicyclopentadiene ring double bond in the last structure above can be in either one of the positions shown.

A preferred catalyst for preparation of the copolymers of this invention comprises (1) a molybdenum or tungsten salt and (2) a dialkylaluminum iodide, an alkylaluminum diiodide, or a mixture of a trialkylaluminum compound with an iodine source.

Examples of useful molybdenum and tungsten salts include the halides such as chlorides, bromides, iodides, and fluorides. Specific examples of such halides include molybdenum pentachloride, molybdenum hexachloride, molybdenum pentabromide, molybdenum hexabromide, molybdenum pentaiodide, molybdenum hexafluoride, tungsten hexachloride, tungsten hexafluoride and the like. Other representative salts include those of acetylacetonates, sulfates, phosphates, nitrates, and the like. Mixtures of salts can also be used. The more preferred salts are the molybdenum halides, especially molybdenum pentahalides. Excellent results were obtained using $MoCl_5$.

The alkylaluminum compounds used in combination with the molybdenum or tungsten salts may be dialkylaluminum iodides, alkylaluminum diiodides, or a mixture of a trialkylaluminum compound with an iodine source. Each alkyl group may contain from 2 to about 12 carbon atoms, preferably from 2 to about 4 carbon atoms. Specific examples of such compounds include diethylaluminum iodide, ethylaluminum diiodide, propylaluminum diiodide and ethylpropylaluminum iodide. A mixture of a trialkylaluminum compound and an iodine source such as elemental iodine may also be used wherein each alkyl group is as defined above, e.g., a mixture of triethylaluminum and elemental iodine. Other iodine sources include methylene diiodide, potassium iodide, titanium tetraiodide, and the like. Excellent results were obtained using diethylaluminum iodide.

The molybdenum or tungsten salt is generally employed at a level from about 0.01 to about 50 millimoles per mole of total monomer, preferably from about 0.5 to about 10 millimoles per mole of total monomer. The organoaluminum compounds described above are generally used in a molar ratio of organoaluminum compound to molybdenum and/or tungsten salt(s) from about 10/1 to about ½, preferably from about 5/1 to about 3/1. Elemental iodine, when used, typically is used in a range from about 0.1 mole to about 10 moles of iodine per mole of organoaluminum compound. When other sources of iodine are employed, sufficient iodine source is incorporated to provide the above concentration of elemental iodine in the catalyst.

In a preferred embodiment, the molybdenum or tungsten salt is dissolved in a solvent prior to incorporation into the polymerization mixture. In the absence of a solvent for the molybdenum or tungsten salt, the polymerization proceeds with some difficulty due to the presence of insoluble portions of salt. A preferred solvent for the molybdenum or tungsten salt comprises at least one alkyl ester of a saturated carboxylic or dicarboxylic acid. Use of an ester solvent has been found to produce a brief induction period of about 1 to about 5 minutes after addition of the molybdenum or tungsten salt to the monomer mixture. Such an induction period allows addition of all components of the reaction mixture before substantial polymerization begins. The result is more uniform process control and, ultimately, substantially gel-free polymers which are more readily recovered from the reaction vessel and are more easily processable than gelled polymers.

Suitable alkyl esters of saturated carboxylic or dicarboxylic acids typically contain from 2 to 5 carbon atoms and 0 or 1 bromine or chlorine atoms, exemplified by methyl formate, ethyl formate, methyl chloroformate, ethyl chloroformate, butyl chloroformate, methyl acetate, ethyl acetate, isopropyl acetate, n-propyl acetate, methyl bromoacetate, ethyl bromoacetate, ethyl chloroacetate, methyl propionate, ethyl propionate, ethyl 2-bromopropionate, ethyl 3-bromopropionate, methyl 2-chloropropionate, dimethylmalonate, and the like. Excellent results were obtained using ethyl acetate.

The above ester solvents may be used together with at least one inert cosolvent. The cosolvent typically constitutes from 0% to about 90% by weight of the total catalyst solvent weight. Additional cosolvent may also be used during polymerization. The additional cosolvent is typically up to about 500 times and more, preferably up to about 150 times, the total catalyst solvent weight. Suitable inert cosolvents include aliphatic or cycloaliphatic hydrocarbon cosolvents containing about 4 to 10 carbon atoms such as pentane, hexane, heptane, octane, cyclohexane, cyclooctane and the like; aromatic hydrocarbon cosolvents containing about 5 to 14 carbon atoms and which are liquid or easily liquified such as benzene, toluene, naphthalene and the like; and substituted hydrocarbons wherein the substituents are inert, such as dichloromethane, chloroform, chlorobenzene and the like. Benzene and toluene are excellent cosolvents.

A polymerization activator may be used but is generally not needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide.

The activator may be employed in a range from about 0 moles to about 3 moles per mole of organoaluminum compound, more preferably from about 0 to about 1 mole per mole. The activator may be added at any point in the charging procedure, but it is more preferably added last.

The monomers may be added at any point in the charging procedure. A preferred charging procedure is as follows. The monomers and solvent(s) are added first to the reactor vessel. These ingredients may be added separately or as a mixture. The alkylaluminum iodide compound, or mixture of trialkylaluminum compound and iodine source, is added next, usually as a solution in a cosolvent such as benzene or toluene described heretofore. The molybdenum or tungsten salt is added next as a solution in a mixture of cosolvent and ester solvent described heretofore, followed by the activator if used.

Monomeric impurities such as water (in amounts larger than suitable for use as an activator) and the like should be removed prior to addition of the molybdenum or tungsten compound. The alkylaluminum iodide compound or mixture of trialkylaluminum compound and iodine source may be used to titrate the monomers or mixture of monomers and solvent(s) until a color change from pink to colorless or slightly yellow is noted. A catalytically effective amount of alkylaluminum iodide compound or a mixture of trialkylaluminum compound and iodine source may then be added, followed by addition of the molybdenum or tungsten compound. The end point of the titration is typically difficult to pinpoint exactly. With minor impurities present, up to ten times the catalytically effective amount and more of the alkylaluminum iodide or mixture of trialkylaluminum compound and iodine source may be required to render the impurities harmless.

The mixing of catalyst components and the polymerization are preferably carried out in an inert atmosphere such as nitrogen and in the substantial absence of air or water. The polymerization may be performed as a batch or continuous operation and is conducted under sufficient pressure to keep the monomers and solvents in liquid state, the pressure required depending upon the reaction temperature. The particular ester solvent system selected must be liquid under the reaction conditions used. The reaction mixture in the reactor may be cooled or heated to polymerization temperature at the start of the additions or at any point during addition of the various reactants. Generally, polymerization temperatures from about −80° C. to about 100° C. can be used, although the reaction generally proceeds especially well at about 20° C. to 75° C. The polymerization may be short-stopped addition of alcohols, amines, alkanolamines or carboxylic acids such as ethanol, diethylamine, acetic acid, ethanolamine and the like.

At the conclusion of the polymerization, the copolymers may be isolated by any method known to the art such as by direct drying under reduced pressure, by coagulation and precipitation using an alcohol such as methanol, ethanol, isopropanol or the like, or by steam or hot water stripping. The polymer is recovered and may be washed further with water or an alcohol and then dried.

The copolymers of this invention are high molecular weight products typically having dilute solution viscosities (DSV) ranging from about 0.2 to about 6, more generally from about 0.5 to about 3. By dilute solution viscosity is meant a value obtained using the following formula:

$$DSV = \ln(t/t_o)/c$$

wherein $t_o$ is toluene flow time and t is flow time of a polymer solution in toluene (both measured at 25° C. in toluene using an Ostwald-Fenske viscometer), and c is the concentration of the polymer solution (measured in grams of polymer per deciliter of toluene at 25° C.). In this case c was 0.25 gram of polymer per deciliter of toluene. The DSV is regarded as a measure of molecular weight and is reported in units of deciliters/gram.

As indicated heretofore, the tetracyclododecenes and dicyclopentadiene both provide high glass transition temperature effects with the tetracyclododecene contribution generally being significantly greater per mole of monomer used. The tetracyclododecenes contribute to enhanced polymer stability. Dicyclopentadiene provides pendant cure sites for subsequent crosslinking reactions and, because it is the least expensive of the three major monomeric components, reduces overall copolymer cost. The norbornene component substantially improves copolymer processability. In fact, without the norbornene component, calendering and thermoforming of the copolymers, including injection molding and extrusion, would be impractical. The four monomeric components produce copolymers having satisfactory glass transition temperatures (typically from about 70° C. to about 190° C.), stability, and processability, as well as reasonable cost and a balance of other properties sufficient to make these polymers attractive substitutes, when properly compounded, for ABS, polycarbonates, certain polyolefins, etc.

The following examples illustrate the present invention more fully.

EXAMPLES

I. Test Methods

In each of the following examples dilute solution viscosity (DSV) was measured as defined heretofore. Glass transition temperature ($T_g$) was measured by differential scanning calorimetry using a Dupont 990 Thermal Analyzer in a nitrogen atmosphere and at a 20° C./minute heat rate. Tensile strength and % elongation at yield were measured by ASTM D-638. The procedure defined in ASTM D648-72 was used at 264 psi to measure heat distortion temperature. Notched izod was measured by ASTM D-256.

II. Polymer Preparations

Reactant Solutions

A 0.25 molar diethylaluminum iodide solution in dry toluene was prepared. 14.9 grams normal 1-hexene was diluted to 100 ml in dry toluene. A $MoCl_5$/ethyl acetate/dry toluene solution (0.05 molar $MoCl_5$ and 3.0 molar ethyl acetate in dry toluene) was prepared and aged for less than an hour at room temperature. Also used were a 90 wt.% solution of dicyclopentadiene in toluene, and 99+% pure samples of 5-methyl-2-norbornene, 2-methyltetracyclododecene, 5-ethyl-2-norbornene and 2-ethyltetracyclododecene.

Solution A was a commercially available solution of 95 vol. parts ethanol, 4.7 vol. parts methanol, 10 vol. parts isopropanol, and 1 vol. part methyl isobutyl ketone. Solution A was used in the shortstopping and coagulation steps of the polymerizations.

III. Polymerization Procedure

In each of the following examples, 500 ml dry toluene cosolvent, varying comonomer amounts, and 6 ml of the diethylaluminum iodide solution were charged to a dry, nitrogen-purged quart bottle. 7.5 ml of the $MoCl_5$ solution was charged last, and the bottle was shaken. After 1 hour the reaction was shortstopped using a mixture of 1 ml ethanolamine, 12 ml of antioxidant solution (10 grams of 2,2'-methylene-bis(4-methyl-6-t-butyl phenol) in 100 ml toluene), and 3 ml Solution A. The polymer cement was coagulated using excess Solution A in a Waring blender. Solid copolymers were recovered by filtration and vacuum drying at 60° C.

Polymerization recipes are set forth in Tables I and II, together with compositions and physical properties of the resulting polymers. Data in Table I is directed to methyltetracyclododecene/5-methyl-2-norbornene/dicyclopentadiene/1-hexene copolymers. Data in Table II is directed to ethyltetracyclododecene/5-ethyl-2-norbornene/dicyclopentadiene/1-hexene copolymers.

TABLE I

Physical Properties of 2-Methyltetracyclododecene/5-Methyl-2-norbornene/Dicyclopentadiene/1-Hexene Copolymers

| Example | 1 | 2 | 3 | 4 | 5 | 6 | 7 | 8 |
|---|---|---|---|---|---|---|---|---|
| Polymerization Recipe | | | | | | | | |
| Toluene, ml | 500 | 500 | 500 | 500 | 500 | 500 | 500 | 500 |
| 2-Methyltetracyclodecene, ml | 7 | 10.5 | 14.0 | 17.5 | 21.2 | 20.9 | 24.7 | 24.5 |
| 5-Methyl-2-norbornene, ml | 32.4 | 28.3 | 24.3 | 20.2 | 24.2 | 18.2 | 28.3 | 21.2 |
| Dicyclopentadiene Solution, ml | 40.3 | 40.3 | 40.3 | 40.3 | 32.3 | 26.9 | 24.2 | 20.2 |
| 1-Hexene Solution, ml | 15 | 15 | 15 | 15 | 15 | 15 | 15 | 15 |
| Diethylaluminum Iodide Solution, ml | 6 | 6 | 6 | 6 | 6 | 6 | 6 | 6 |
| $MoCl_5$/Ethyl Acetate/Toluene Solution, ml | 7.5 | 7.5 | 7.5 | 7.5 | 7.5 | 7.5 | 7.5 | 7.5 |
| Polymer Composition | | | | | | | | |
| 2-Methyltetracyclododecene, wt. % | 10 | 15 | 20 | 25 | 30 | 35 | 35 | 41 |
| 5-Methyl-2-norbornene, wt. % | 40 | 35 | 30 | 25 | 30 | 26 | 35 | 30 |
| Dicyclopentadiene, wt. % | 50 | 50 | 50 | 50 | 40 | 39 | 30 | 29 |
| Polymer Physical Properties | | | | | | | | |
| Dilute Solution Viscosity (DSV) | 1.73 | 1.58 | 1.47 | 1.47 | 1.26 | 1.12 | 1.27 | 1.17 |
| Glass Transition Temp. ($T_g$), °C. | 114 | 122 | 131 | 142 | 136 | 145 | 133 | 142 |
| Tensile Strength @ Yield, MPa | 52.22 | 53.25 | 55.49 | 59.46 | 60.70 | 58.53 | 59.83 | 57.97 |
| % Elongation @ Yield | 7.7 | 8.4 | 7.9 | 8.8 | 9.9 | 8.8 | 9.2 | 9.3 |
| Heat Distortion Temp., °C. | 81 | 83 | 92 | 97 | 95.5 | 103 | 94 | 98 |
| Notched Izod @ 27° C., J/cm. | 0.51 | 0.49 | 0.49 | 0.58 | 0.54 | 0.43 | 0.61 | 0.31 |
| Notched Izod @ −29° C., J/cm. | 0.71 | 0.65 | 0.62 | 0.76 | — | 0.71 | — | 0.55 |
| Example | 9 | 10 | 11 | 12 | 13 | 14 | 15 | 16 |
| Polymerization Recipe | | | | | | | | |
| Toluene, ml | 500 | 500 | 500 | 500 | 500 | 500 | 500 | 500 |
| 2-Methyltetracyclododecene, ml | 28.3 | 31.8 | 28 | 31.5 | 38.8 | 38.5 | 45.9 | 45.5 |

TABLE I-continued

Physical Properties of 2-Methyltetracyclododecene/5-Methyl-2-norbornene/Dicyclopentadiene/1-Hexene Copolymers

| | | | | | | | | |
|---|---|---|---|---|---|---|---|---|
| 5-Methyl-2-norbornene, ml | 32.4 | 36.4 | 24.2 | 27.2 | 28.3 | 21.2 | 20.2 | 15.1 |
| Dicyclopentadiene Solution, ml | 16.1 | 8.1 | 13.5 | 6.7 | 8.1 | 6.8 | 8.1 | 6.8 |
| 1-Hexene Solution, ml | 15 | 15 | 15 | 15 | 15 | 15 | 15 | 15 |
| Diethylaluminum Iodide Solution, ml | 6 | 6 | 6 | 6 | 6 | 6 | 6 | 6 |
| MoCl$_5$/Ethyl Acetate/Toluene Solution, ml | 7.5 | 7.5 | 7.5 | 7.5 | 7.5 | 7.5 | 7.5 | 7.5 |
| Polymer Composition | | | | | | | | |
| 2-Methyltetracyclododecene, wt. % | 40 | 45 | 46 | 52 | 55 | 61 | 65 | 71 |
| 5-Methyl-2-norbornene, wt. % | 40 | 45 | 35 | 38 | 35 | 29 | 25 | 20 |
| Dicyclopentadiene, wt. % | 20 | 10 | 19 | 10 | 10 | 9 | 10 | 9 |
| Polymer Physical Properties | | | | | | | | |
| Dilute Solution Viscosity (DSV) | 1.27 | 1.34 | 1.09 | 1.16 | 1.16 | 0.89 | 0.96 | 0.76 |
| Glass Transition Temp. (T$_g$), °C. | 128 | 124 | 137 | 132 | 124 | 153 | 157 | 171 |
| Tensile Strength @ Yield, MPa | 57.53 | 56.49 | 57.59 | 58.18 | 61.80 | 62.21 | 64.56 | 67.04 |
| % Elongation @ Yield | 9.5 | 8.8 | 8.8 | 8.4 | 8.8 | 9.3 | 9.2 | 9.5 |
| Heat Distortion Temp., °C. | 87 | 79 | 97 | 89 | 95 | 112 | 116 | 119 |
| Notched Izod @ 27° C., J/cm. | 0.46 | 0.48 | 0.36 | 0.35 | 0.47 | 0.22 | 0.56 | 0.36 |
| Notched Izod @ −29° C., J/cm. | — | — | 0.55 | 0.48 | — | 0.52 | — | 0.43 |

TABLE II

Physical Properties of 2-Ethyltetracyclododecene/5-Ethyl-2-norbornene/Dicyclopentadiene/1-Hexene Copolymers

| Example | 17 | 18 | 19 | 20 | 21 | 22 | 23 | 24 | 25 | 26 |
|---|---|---|---|---|---|---|---|---|---|---|
| Polymerization Recipe | | | | | | | | | | |
| Toluene | 500 | 500 | 500 | 500 | 500 | 500 | 500 | 500 | 500 | 500 |
| 2-Ethyltetracyclododecene, ml. | 7.2 | 10.7 | 14.3 | 17.9 | 21.5 | 25 | 28.7 | 32.2 | 39.4 | 46.6 |
| 5-Ethyl-2-norbornene, ml. | 32 | 28.1 | 24.1 | 20.1 | 24.1 | 28.1 | 32.1 | 36.2 | 28.1 | 20.1 |
| Dicyclopentadiene Solution, ml. | 64.8 | 45.4 | 45.4 | 45.4 | 36.3 | 27.2 | 18.2 | 9.1 | 9.1 | 9.1 |
| 1-Hexene Solution, ml. | 11 | 11 | 10.5 | 14 | 16 | 18 | 18 | 19 | 23 | 29 |
| Diethylaluminum Iodide Solution, ml. | 6 | 6 | 6 | 6 | 6 | 6 | 6 | 6 | 6 | 6 |
| MoCl$_5$/Ethyl Acetate/Toluene Solution, ml. | 7.5 | 7.5 | 7.5 | 7.5 | 7.5 | 7.5 | 7.5 | 7.5 | 7.5 | 7.5 |
| Polymer Composition | | | | | | | | | | |
| 2-Ethyltetracyclododecene, wt. % | 8 | 14 | 19 | 23 | 28 | 33 | 39 | 44 | 54 | 64 |
| 5-Ethyl-2-norbornene, wt. % | 30 | 33 | 28 | 24 | 29 | 34 | 39 | 45 | 35 | 25 |
| Dicyclopentadiene, wt. % | 62 | 53 | 53 | 53 | 43 | 33 | 22 | 11 | 11 | 11 |
| Polymer Physical Properties | | | | | | | | | | |
| Dilute Solution Viscosity (DSV) | 0.74 | 0.65 | 0.66 | 0.59 | 0.58 | 0.54 | 0.66 | 0.59 | 0.49 | 1.04 |
| Glass Transition Temp. (T$_g$), °C. | 117 | 114 | 120 | 127 | 118 | 112 | 106 | 100 | 113 | 127 |
| Tensile Strength @ Yield, MPa | 51.98 | 51.01 | 53.49 | 54.60 | 52.93 | 44.39 | 47.70 | 46.81 | 46.39 | 47.98 |
| % Elongation @ Yield | 5.6 | 8.6 | 9.1 | 9.2 | 7.9 | 7.5 | 8.8 | 8.1 | 7.7 | 7.0 |
| Heat Distortion Temp., °C. | 78 | 77 | 82 | 87 | 77 | 66 | 70 | 65 | 70 | 85 |
| Notched Izod @ 27° C., J/cm. | 0.56 | 0.42 | 0.44 | 0.32 | 0.36 | 0.24 | 0.21 | 0.26 | 0.18 | 0.18 |

We claim:

1. A ring-opening polymerized copolymer comprising polymerized units of (1) about 5 to about 80 wt.% of tetracyclododecene, at least one alkyltetracyclododecene wherein each alkyl group contains from 1 to about 8 carbon atoms, or a mixture thereof, (2) about 10 to about 80 wt.% of norbornene, at least one alkylnorbornene wherein each alkyl group contains from 1 to about 8 carbon atoms, or a mixture thereof, (3) about 5 to about 80 wt.% of dicyclopentadiene, and (4) a minor amount of at least one acyclic monoolefin or nonconjugated acyclic olefin containing from 2 to 12 carbon atoms and having at least one hydrogen on each double-bonded carbon atom, all of said weight percentages being based upon total copolymer weight, and said copolymer containing groups of the following types, where m, n and p are numbers which are proportional to the concentrations of tetracyclododecene/alkyltetracyclododecene, norbornene/alkylnorbornene, and dicyclopentadiene respectively, and any X is hydrogen or an alkyl group containing from 1 to about 8 carbon atoms:

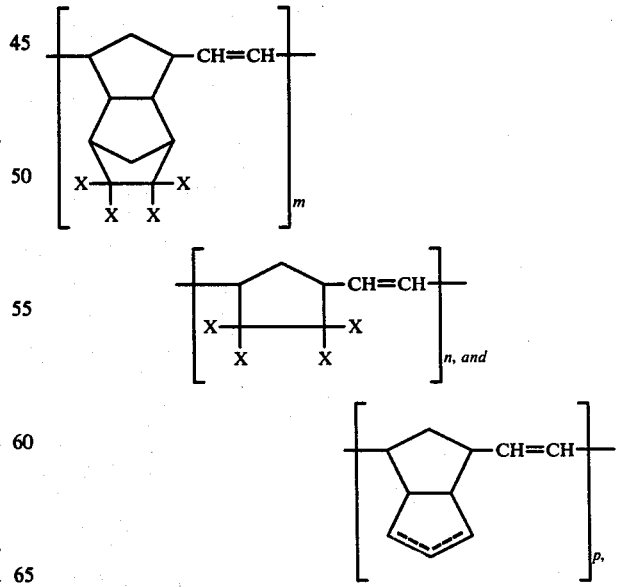

wherein the ring double bond in the last formula above can be in either position shown.

2. A copolymer of claim 1, wherein the amount of comonomer (1) is from about 10 wt.% to about 40 wt.%, the amount of comonomer (2) is from about 10 wt.% to about 60 wt.%, and the amount of comonomer (3) is from about 40 wt.% to about 70 wt.%.

3. A copolymer of claim 2 wherein said acyclic monoolefin is a 1-olefin or 2-olefin containing from 2 to 8 carbon atoms.

4. A copolymer of claim 3 wherein comonomer (1) is 2-methyltetracyclododecene, comonomer (2) is 5-methyl-2-norbornene, and comonomer (4) is 1-hexene.

5. A copolymer of claim 3 wherein comonomer (1) is 2-ethyltetracyclododecene, comonomer (2) is 5-ethyl-2-norbornene, and comonomer (4) is 1-hexene.

* * * * *